United States Patent

Cioppa

[15] 3,704,529
[45] Dec. 5, 1972

[54] TRAINING AND INSTRUCTION DEVICE FOR PERFORMING CRICOTHYROIDOTOMY

[72] Inventor: Forrest J. Cioppa, 3346 Vaughn Road, Lafayette, Calif. 94549

[22] Filed: July 13, 1970

[21] Appl. No.: 54,283

[52] U.S. Cl. ..................................... 35/17, 128/305
[51] Int. Cl. ...................... G09b 23/30, A61b 17/00
[58] Field of Search .......... 35/17, 49, 54; 206/63.2 R, 206/63.2 A; 128/305

[56] References Cited

UNITED STATES PATENTS

| | | | |
|---|---|---|---|
| 3,182,663 | 5/1965 | Abelson | 128/305 |
| 3,376,659 | 4/1968 | Asin et al. | 35/17 |
| 2,689,415 | 9/1954 | Haver | 35/17 |
| 2,159,925 | 5/1939 | Wood | 35/54 |
| 2,966,986 | 1/1961 | Jones | 206/63.2 |

Primary Examiner—Wm. H. Grieb
Attorney—Warren, Rubin, Brucker & Chickering

[57] ABSTRACT

A training and instruction device for performing a cricothyroidotomy on a patient having an upper airway obstruction and including an anatomical model of the human throat formed with a cricothyroid notch for visual and tactile instruction of the location of the cricothyroid notch and the corresponding anatomical landmark on the patient, and a hollow bore needle demountably secured adjacent the model for removal and insertion into the throat of the patient at the thus identified cricothyroid notch.

4 Claims, 4 Drawing Figures

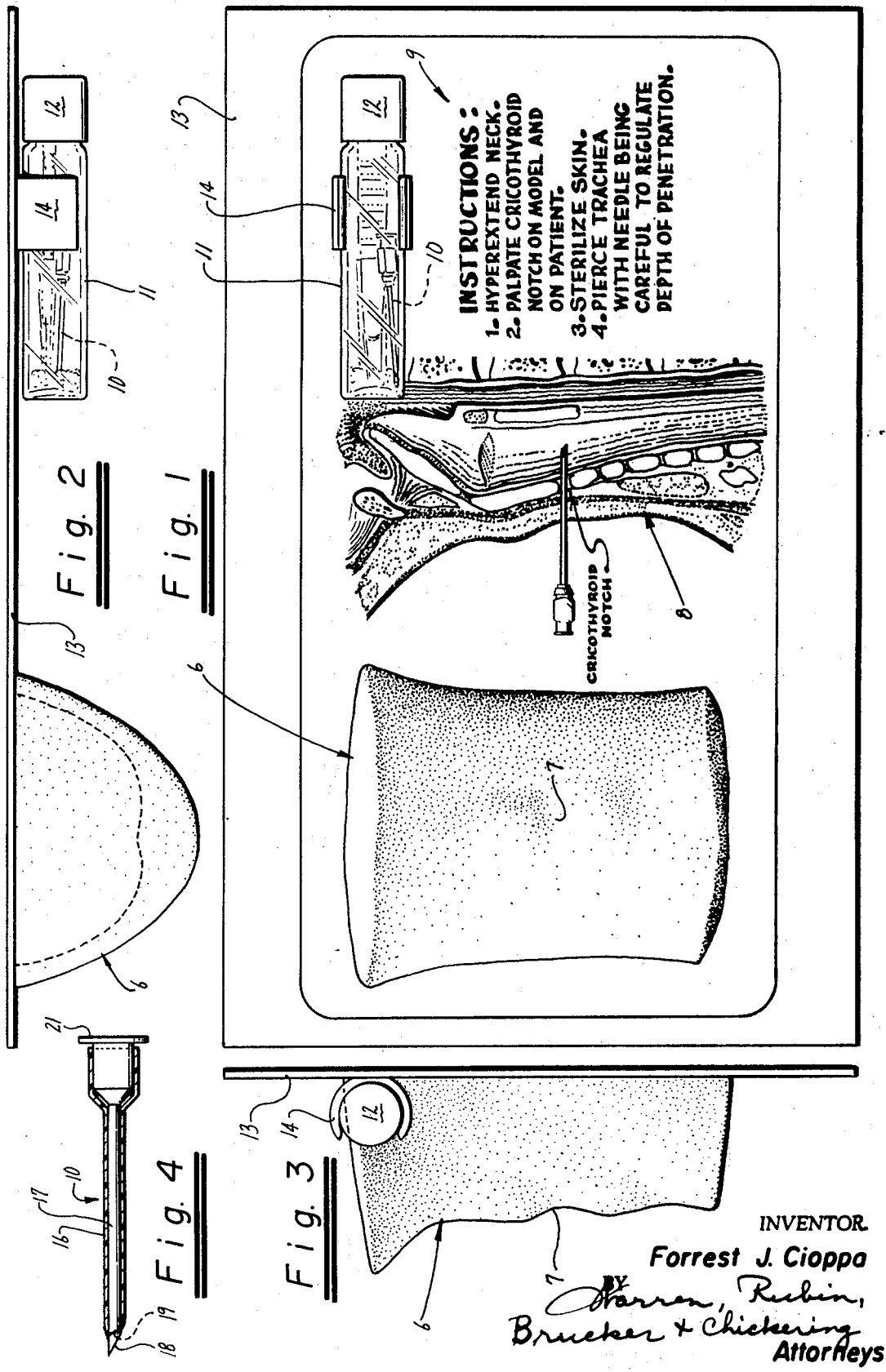

TRAINING AND INSTRUCTION DEVICE FOR PERFORMING CRICOTHYROIDOTOMY

The invention relates to medical instruments and more particularly to surgical training and instructional devices.

Whatever its cause, obstruction of the upper airway in a human being gives rise to an emergency which may easily prove fatal. In such circumstances a trained surgeon might immediately perform a cricothyroidotomy by entering an auxiliary airway at the cricothyroid membrane. This is a comparatively simple procedure when performed by a skilled and knowledgeable surgeon and involves minimum risk or danger to the patient. The latter is true where entry is made at the proper location of the throat and which is conveniently marked at the cricothyroid notch. A serious problem, however, arises when the emergency occurs in the absence of a skilled surgeon and when physicians, nurses, ambulance attentants and other paramedical personnel must act quickly if the life of the patient is to be saved. In such case the finding of the precise point at which the airway is to be inserted is the problem. To insert the airway above or below the desired spot may result in serious complications. For this reason the suggested procedure has not been more widely adopted and used with the result that many lives are lost each year.

An object of the present invention is to provide a training and instruction device for performing a cricothyroidotomy which will assist physicians who are non-surgeons, dentists, nurses and medical aid personnel who may otherwise be unsure of detailed neck anatomy, to move surely and precisely to the exact point of safe entry into the patient's throat, viz. the cricothyroid notch and to insert a hollow bore needle into the interior airway of the throat all within the very short period of time available in the emergency, life-threatening situation described where death may be but a moment away.

Another object of the present invention is to provide a relatively small wall mounted device which may be conveniently mounted in doctors' offices, emergency rooms, ambulances and the like, and which will provide most effective combined visual and tactile instruction in the performing of a cricothyroidotomy.

The invention possesses other objects and features of advantage, some of which with the foregoing will be set forth in the following description of the preferred form of the invention which is illustrated in the drawing accompanying and forming part of this specification. It is also to be understood, however, that variations in the showing made by the said drawing and description may be adopted within the scope of the invention.

Referring to said drawing:

FIG. 1 is a front elevation of a training and instruction device for performing a cricothyroidotomy;

FIG. 2 is a plan view of the device;

FIG. 3 is a side elevation of the device;

FIG. 4 is a side elevation of a hollow bore needle forming part of the present device.

The training and instruction device of the present invention consists briefly of a three-dimensional anatomical model 6 of the human throat formed with a cricothyroid notch 7 for visual and tactile instruction of the location of this notch and the corresponding anatomical landmark on the patient, and a hollow bore needle 10 demountably secured adjacent the model 6 for removal and insertion into the patient's throat at the cricothyroid notch thus identified. Preferably the model is formed of a soft resiliently compressible material such as natural or synthetic rubber and of a size and shape closely resembling that of the human larynx with the cricothyroid notch 7 in clear relief and easily identifiable to palpation. The model may be composed of plastic to simulate the cartilage and covered by a type of foam rubber as used in doll manufacture to simulate the muscle and subcutaneous tissue and finally a plastic covering to simulate the skin. If desired, two or more anatomical models may be used in sizes representing adult and infant larynxs.

Preferably also, a drawing 8 of a sagittal section through the human neck is mounted adjacent model 6 and pinpointing the cricothyroid notch and showing the positioning of a hollow bore needle therethrough and into the interior airway of the throat. Also associated with the model and drawing are step by step printed instructions 9 to hyperextend the neck of the patient; palpate the cricothyroid notch on the model and on the patient; sterilize the skin of the patient; and pierce the trachea with the needle being careful to regulate the depth of penetration. Thus the user of the device is furnished immediate and complete visual and tactile instructions for making a safe and sure cricothyroidotomy under emergency life-saving conditions. Personnel are desirably encouraged to refresh their knowledge of the critical anatomical landmarks by periodically palpating the model.

The type of needle used may be left to the discretion of the supervising physician. In its simplest form, as here illustrated, it may be a large bore straight needle of suitable length to limit the extent of insertion, and preferably with an obturator. With reference to FIG. 4, I prefer to use a needle 10 comprising a large bore plastic tube 16 constructed of a thermal plastic and of a wall thickness resisting collapse; and an internally mounted metal obturator 17 having a sharpened leading edge 18 normally extending beyond the end 19 of the needle, and a stop or back piece 21 which may be used to force the entry of the needle through the cricothyroid membrane and subsequently effect the withdrawal of the obturator from the hollow needle which remains in place to provide the needed supplementary airway. A plastic cannula is preferred over metal to minimize the risk of injury to the tracheal mucosa.

The needle is here mounted in a sterilized container 11 having a demountable closure means 12 such as a threaded cap, permitting removal of the needle at time of emergency use. Preferably all of the parts: model 6, drawing 8, instructions 9, and container 11, are assembled in operative association on a mounting board 13 which may be conveniently hung in hospital emergency rooms, doctors' offices, and other areas where medically trained personnel may be expected to encounter emergency upper airway obstructions in patients. Container 11 is demountably secured on board 13, as by clip 14 for easy removal, cleaning and sterilization.

Where a relatively large bore cannula is used, there is desirably included in container 11, a pointed scalpel which may be used to initially puncture the membrane to open the way for insertion of the needle.

It will now be clear that the device of the present invention is designed not only as a training device but more importantly to provide immediate and on the spot instruction in the reality of a life-threatening situation to guide medical or paramedical personnel in the sure, precise, safe and effective performance of a cricothyroidotomy.

I claim:

1. An apparatus to aid in performing an emergency cricothyroidotomy on a patient having an upper airway obstruction comprising:
   a three-dimensional anatomical model of a human throat formed to define thereon a visible and palpable contour of the cricothyroid notch for observation and tactile contact thereof by a user of said apparatus to aid the user in the location of the corresponding notch on the throat of a patient;
   a hollow bore needle; and
   means mounting said model and needle proximate each other with said needle demountably secured thereto to permit removal and use to perform a cricothyroidotomy, said means positionable to a location proximate a patient to be treated.

2. The apparatus in accordance with claim 1 and wherein further a drawing carried by said means, said drawing displaying the sagittal section through the human neck and a hollow bore needle positioned through the cricothyroid notch and into the interior airway of the throat.

3. The apparatus in accordance with claim 2 and printed instructions affixed to said means in association with said model, drawing and needle.

4. A method for enabling paramedical personnel to perform an emergency cricothyroidotomy on a patient having an upper airway obstruction comprising:
   examining an anatomical model of the human throat formed with a cricothyroid notch for visual and tactile determination of the location of said notch;
   locating the corresponding cricothyroid notch on the patient;
   referring to a drawing of a sagittal section through the human neck and a hollow bore needle positioned through the cricothyroid notch; and
   inserting a hollow bore needle through the cricothyroid notch of the patient and into the interior airway of the patient's throat in accordance with said drawing.

* * * * *